May 5, 1942.   H. S. INDGE   2,282,145
MACHINE FOR LAPPING THE WAYS OF A MACHINE TOOL
Filed Aug. 17, 1939   2 Sheets-Sheet 1
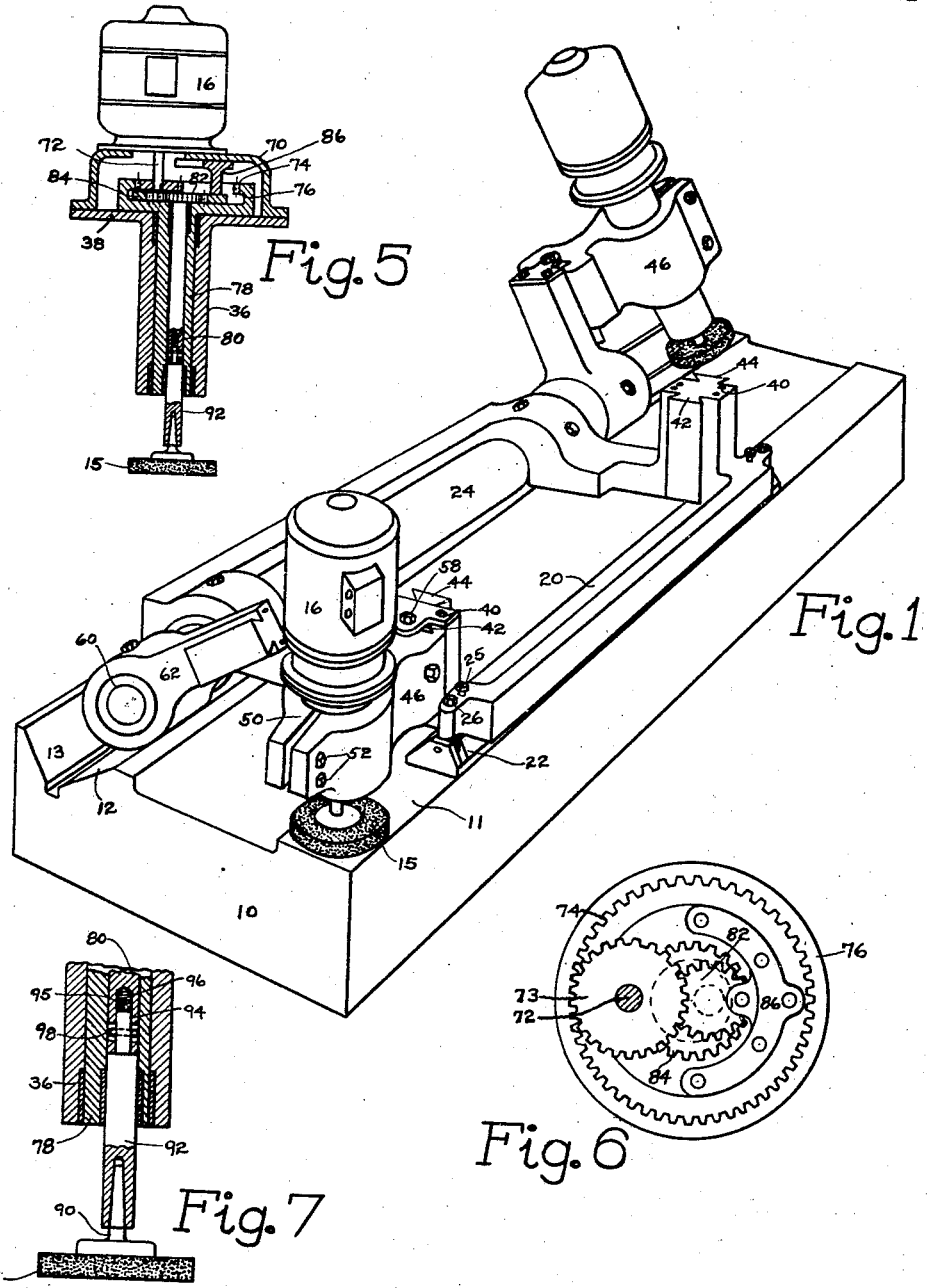
Witness:
Charles H. Amidon
Inventor
HERBERT S. INDGE
By Clayton L. Jenks
Attorney

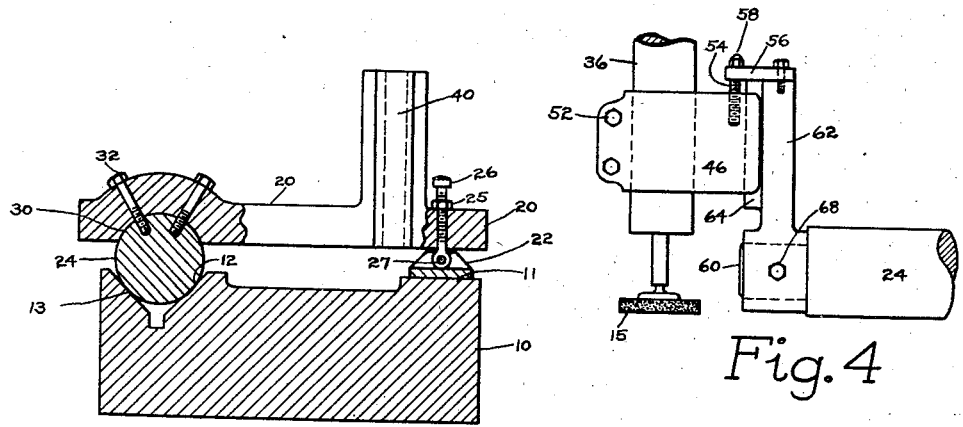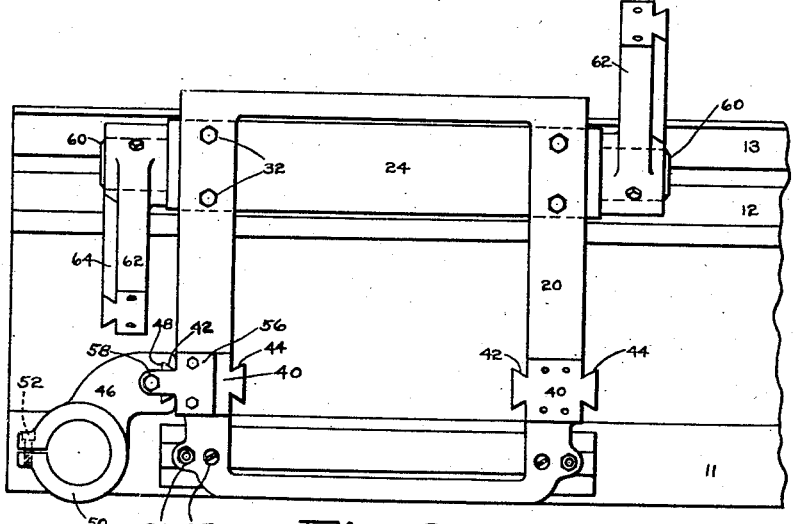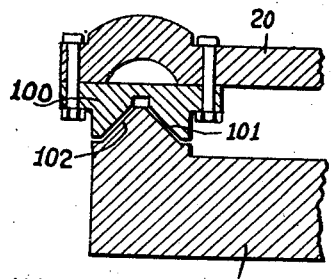

Patented May 5, 1942

2,282,145

UNITED STATES PATENT OFFICE 2,282,145

MACHINE FOR LAPPING THE WAYS OF MACHINE TOOLS

Herbert S. Indge, Westboro, Mass., assignor to Norton Company, Worcester, Mass., a corporation of Massachusetts Application August 17, 1939, Serial No. 290,652

9 Claims. (Cl. 51—170)

This invention relates to a device for lapping or finishing the ways of a machine tool and similar plane surfaces.

A machine tool, such as a lathe or a grinding machine, usually has a V-way and a horizontal plane way on which table is reciprocated. It has been customary, according to the past practices of the machine tool industry, to cut these ways on a planer, and then finish them by means of a sharp edged scraping tool. The art of scraping down the high spots and leveling off the surface is a highly skilled one, and the different mechanics have various theories and methods of procedure for accomplishing the desired purpose. One method is to place a red lead paste on the surface and then reciprocate a carefully trued form once or twice across the way to indicate where the high spots are located, so that the scraper may then be used to cut down those spots; and by repeated trial and error the mechanic will ultimately obtain a surface which is considered satisfactory. The theory underlying such procedure has been based on the idea that an oil film must be held in shallow pockets or valleys closely spaced along the way surface, since otherwise the oil would not be held in place. It has been considered, therefore, that the ornamental flourishes or patterns made by the final scraping operation provided suitably located valleys for the oil pockets; and it has been commonly believed that if the engaging surfaces were too smooth, they would tend to force out the oil film and so present a high frictional resistance to movement of the machine tool table.

As to the result of such procedures and beliefs, the machine tool tables have not been properly mounted on their ways and they have not been readily and easily moved by the power or hand mechanism employed. In particular, they have not provided the necessary degree of accuracy required today. For example, various operating parts of an automobile, such as a bearing, should sometimes be made with a precision of 0.0001 inch or even less; but the ways on the table and the base of the machine tool may not have been made with sufficient accuracy to insure such fine precision.

It is accordingly the primary object of this invention to provide an apparatus which will serve to shape the ways of a machine tool and similar plane surfaces and provide bearing surfaces of required accuracy and alignment with true planes which will satisfy the rigid requirements of the modern machine tool industry. Further objects will be apparent in the following disclosure.

To satisfy the above object, I propose to finish the ways of a machine tool and similar surfaces by a lapping operation and thereby provide them with a smooth surface which lies substantially in a plane throughout its entire length, and wherein the degree of error is exceedingly small, so that the machine tool table may be mounted and moved with a precision heretofore not easily attainable. This is preferably accomplished by means of a device having surfaces arranged to be reciprocated within the rough ways to be finished and which carries a lapping tool so mounted and operated that it will serve to finish those supporting surfaces while the framework is moved there along.

A preferred form of this apparatus is illustrated in the drawings wherein:

Fig. 1 is a perspective view of the device mounted in place on the ways of a machine tool;

Fig. 2 is a top plan view of the device mounted on the ways, but with one tool support and the lapping tools removed;

Fig. 3 is a transverse section of the frame with the lapping tools and tool supports removed;

Fig. 4 is a fragmentary detail showing the lapping tool mounted on one part of the device;

Fig. 5 is a central, vertical section of the lapping tool removed from the framework;

Fig. 6 is a plan view of the gear mechanism of Fig. 5;

Fig. 7 is a fragmentary enlarged detail showing the manner of mounting the lapping tool on its rotating spindle; and Fig. 8 is a fragmentary sectional view showing how the frame is supported on the projecting V-way of a table.

In Figs. 1 and 2 of the drawings, I have shown diagrammatically a machine tool base 10 having a horizontal plane way 11 and a V-way provided with converging plane surfaces 12 and 13 thereon. For the purpose of lapping these surfaces accurately, I provide a rotating abrasive lap 15 driven by a suitable electric motor 16 through gear mechanism so arranged as to provide a breakup motion for the lapping member 15. The lapping member 15 is preferably shaped as a wheel and so mounted that its flat end face engages the surface to be finished. Means is provided whereby this rotating lapping wheel 15 may be moved over the surface to be lapped, and this preferably comprises a framework so constructed and arranged that it may be mounted and reciprocated on the ways to be finished. Hence, as the ways become more accurately shaped, they will serve to guide the lapping tool more accurately as the procedure goes on and thus produce ultimately the desired object.

The lap supporting device preferably comprises a frame or support 20 having an adjustable foot 22 mounted to slidably rest upon the plane way 11. The support 20 also carries a member adapted to fit in the V-way formed by the surfaces 12 and 13; and for this purpose I preferably provide a cylindrical body 24 which has been accurately shaped and is so mounted that it will present a line contact with the ways 12 and 13 while the foot 22 rides on the other way 11. It is desirable that the V-ways of the machine tool be so shaped that the line of intersection of their planes is straight and substantially parallel with the plane way 11. Hence, these two supporting members 22 and 24 should be accurately mounted relative to each other. The frame 20 is preferably a hollow body in order to provide lightness of weight and to permit a lapping tool operating within the frame; but it is made of sufficient rigidity so that it will not be bent under the duty imposed thereon.

The foot 22 comprises a long member having its under surface shaped accurately as a plane way so that it will ride on the plane way 11 of the machine tool. This foot 22 is removably and adjustably mounted on the framework 20, such as by the two push and pull adjusting screws 25 and 26. Each pull screw 26 has an eye at its lower end pivotally mounted on a pin 27 carried by a lug on the foot 22, so that the foot 22 may be tilted or otherwise moved to align it with the ways. The push screws 25 serve to hold the foot 22 immovably locked in its adjusted position. This construction serves to adjust the bottom of the foot 22 relative to the bar 24 for various depths of V-ways.

The cylindrical bar 24 is mounted in a shallow cylindrical recess 30 on the under side of the frame 20, and it is secured thereto by cap screws 32. The bar 24 should be carefully shaped as a true cylinder so that it will make line contact with each of the surfaces of the V-way. This bar being cylindrical, will, of course, interfit with V-ways of various sizes and angles. Also, the foot 22 may be replaced by another member suitable for wider or narrower tables. Various expedients may be adopted to insure accuracy of alignment of the support relative to the ways to be lapped.

The lapping tool 15, as shown particularly in Fig. 5, is mounted on a head having a depending cylindrical portion 36 and a horizontal part 38. The rectangular frame 20 is provided with a tool post, and preferably several, so arranged and located that the lapping tool head may be removably and adjustably mounted in proper position for lapping the adjacent way. I prefer to provide a tool post for each of the ways to be lapped and to locate a pair of these posts at each end of the reciprocable support, and to so construct the parts that the posts for use in lapping the V-way may be adjusted to accommodate different angles of the ways. As illustrated, the frame 20 is provided with two tool posts 40 mounted on its opposite ends which are so located that the lapping tool 15 mounted thereon may ride along the plane way 11 of the machine tool. Each of these tool posts 40 is vertical and has dovetailed slideways 42 and 44 on its opposite sides which are perpendicular to the way to be lapped. These ways 42 and 44 are made alike so that a single removable and adjustable clamping bracket or slide 46 may interfit with either of them.

The slide or bracket 46 has a recessed end providing a dovetailed surface 48 adapted to fit on any one of the dovetailed posts 40 of the frame 20. At its other end, the bracket 46 has a split sleeve 50 shaped to provide an inner cylindrical surface which will slidably engage the supporting member 36 that carries the lapping wheel 15. Set screws 52 passing through the ends of the split sleeve 50 will serve to clamp the lapping support 36 adjustably in place. As shown in Fig. 4, the bracket 46 is held in an adjusted vertical position by means of a screw 54 threaded into the bracket 46 and passing freely through a plate 56 attached to the tool post 40. The bracket 46 slides freely on the dovetailed way of the post 40, but the head 58 of the nut 54 holds the lap properly positioned. Hence, by this construction it will be appreciated that the lapping tool bracket 46 may be mounted on either of the slideways 42 and 44, and the lap 15 may be located either inside or outside of the hollow frame 20, so that any and all portions of the slideway 11 may be lapped. One may use the same lapping tool for lapping all of the ways, or two or more tools may be mounted on the posts at the same time, as is indicated in Fig. 1.

A somewhat similar construction is employed for lapping the V-way. The cylindrical supporting member 24 has its opposite ends reduced in size, and on the reduced cylindrical ends 60, one may mount a special post 62 which is provided with a hollow bearing shaped to fit thereon. The post 62 has a dovetailed slideway 64 of the required shape and dimensions to fit the slideway of the bracket 46 which carries the lapping tool 15. The post 62 is held in any desired angular position by means of a set screw 58 threaded thtrethrough and engaging the reduced cylindrical end 60 of the bar 24. Hence, the lapping tool 15 may be tilted to any required position so that the flat end face of the lapping wheel 15 will fit properly against either of the ways 12 and 13.

The lapping tool 15 may be mounted and arranged to be moved in any desired manner to lap the ways, as the frame is reciprocated either by power or by hand along the ways. It is preferably shaped as a wheel which is mounted to be rotated eccentrically about a center line so as to provide a breakup motion and prevent an individual abrasive grain from cutting a circular path when the frame is stationary. A simple construction involving this principle is shown in Figs. 5 and 6. The electric motor 16 is mounted on a stationary cover plate 70 which is in turn suitably secured to the head 38. The shaft 72 of the electric motor has a gear 73 on its lower end, and this gear meshes with an internal gear 74 formed on the inside of the head 76 of a sleeve 78 which is rotatably mounted within suitable bearings inside of the depending stationary casing 36. Eccentrically mounted within this sleeve 78 is a shaft 80 which is indirectly connected with the lapping wheel 15. The upper end of this shaft 80 has a gear 82 keyed thereon, and this gear meshes with another stationary internal gear 84 formed on the lower end of a bracket 86 which is fastened to the inside of the cap 70.

It will thus be seen that when the motor shaft 72 is rotated at a comparatively rapid rate, its gear 73 meshing with the internal gear 74 causes the latter to revolve and thus to rotate the sleeve 78. The shaft 80 is eccentrically mounted in this sleeve 78 and thus is giving a comparatively rapid eccentric motion but which is several times slower than that of the rotation of the motor shaft 72. As this internal gear 74 goes around, it causes the gear 82 on the top of the wheel shaft 80 to revolve in contact with the stationary internal gear 84. This causes the grinding wheel shaft 80 to rotate at a slower rate. While the operation of the device may be changed materially within the scope of this invention, it is preferred to have the electric motor so constructed that it will rotate at about 1200 revolutions per minute, and the gear ratio is such that the sleeve 78 driven by the larger internal gear 74 will rotate at about 500 R. P. M. The gear ratio connecting these parts with the lapping wheel 15 may be such that the wheel will rotate much slower, such as at about 100 R. P. M. Hence, the wheel 15 will creep around through an eccentric path while it slowly rotates, and the rotation is preferably about one for each two or three or more gyrations of the eccentric sleeve 78. It is also desirable that there be an odd number of teeth or that the parts be so constructed as to provide a hunting tooth so that the wheel will not rotate through an even fraction of a gyration of the outer sleeve.

It is preferable that the wheel be held against the work with a resilient pressure. Various constructions may be employed for this purpose. A suitable construction is shown particularly in Fig. 7, in accordance with which the shaft 90 of the lapping wheel 15 is provided with a tapered end which fits within a conical recessed supplemental shaft 92 so that the wheel and shaft 92 rotate together. The shaft 92 has a reduced upper end 94 slidably fitting within a socket 95 formed in the lower end of the shaft 80. A compression spring 96 is placed within this socket 95 above the shaft end 94 and since the parts are freely slidable vertically then the lapping wheel 15 may be held against the work under the resilient pressure imparted by the spring 96. A pin 98 passing through the shaft 92 rides within a slotted recess in the shaft 80 and thus forms a driving connection between the two parts. The pressure on the springs 96 may be adjusted by means of the adjusting screw 58 (Fig. 4) which positions the bracket 46 carrying the lapping tool 15.

The supporting frame 20 may be moved by hand along the ways to be lapped or it may be reciprocated by any suitable power mechanism. It may, for example, be so mounted on the ways of a grinding machine or a planer which is to have its ways trued that the power mechanism of the machine itself may be employed to cause the frame to travel along the plane and V-ways. To plane the under ways of a table, the latter may be placed bottom side up on the table of the planer, and the frame 20 may be held stationary but connected to the tool post or other stationary part of the machine tool so that the table may be reciprocated back and forth relative to the lapping wheel or wheels on the frame.

It will be understood that the device applies for lapping the ways of the reciprocable table as well as for the ways on which the table reciprocates, and the claims are to be interpreted as covering the finishing of either or both sets of ways of the machine tool. If the table ways are to be lapped, then, as shown in Fig. 8, the cylindrical rod 24 may be replaced by a member 100 removably bolted to the support 20 which has a suitably shaped way 101 to interfit with the projecting V-way 102 on the table 10. This construction insures a proper alignment and reciprocation of the frame 20.

In view of the above disclosure, it will be appreciated that various substitutions, modifications and structural changes may be made by one skilled in the art without departing from the scope and spirit of this invention. Hence, the above description is to be interpreted as illustrating the general principles of the invention and a preferred embodiment thereof and not as imposing any limitation thereon, beyond that defined by the appended claims.

I claim:

1. A device for lapping the plane faces of the flat and V-ways of a machine tool comprising a frame having a suporting member slidably interfitting with the V-way and a second supporting member slidable on the flat way, a lapping wheel having an effective flat surface, means for mounting the wheel with its axis perpendicular to either one of the surfaces of the V-way and its effective surface in contact therewith and means for rotating and eccentrically moving the axis of the wheel to provide a break up lapping action.

2. A device for lapping the plane faces of the flat and V-ways of a machine tool comprising a frame having a supporting member slidably interfitting with the V-way and a second supporting member spaced therefrom for sliding on the flat way, a lapping device presenting an operative flat surface, means on the frame for supporting the flat surface of said device in effective contact with any one of the plane faces of both of said ways and driving mechanism for moving said lapping device to provide a break up lapping motion.

3. A device for lapping the ways of a machine tool having a flat way and a V-way comprising a support having a member provided with a round surface adapted to interfit with and reciprocate along the V-way, a second member positioned to contact with the flat way, means for adjusting one of said members relative to the ways to align both of them with the ways, a lapping tool, means for mounting the tool on the support in contact with one of the ways and means for moving the lapping tool so as to provide a break up motion and lap the way as the support is reciprocated.

4. A device for lapping the ways of a machine tool having a flat way and a V-way comprising a support having members shaped and arranged to be reciprocably mounted on both of said machine tool ways, means for adjusting one of said members relative to the other to align the support with both of the ways, a lapping tool having an operative flat face, means for mounting the same on the support and holding the flat face of the tool in abrading contact with a surface of the V-way and driving mechanism for moving the tool and providing a break up lapping operation as the support is reciprocated.

5. A device for lapping the plane faces of the flat way and the V-way of a machine tool comprising a freely reciprocable support having a member slidably interfitting with the V-way and a second member slidable on the flat way, a lapping tool and means on the support for removably and adjustably mounting said tool in abrading contact with any one of the plane faces of both of said ways and driving mechanism for moving the lapping tool and providing a break up motion to lap the way as the support is reciprocated.

6. A device for lapping the flat way and the V-way of a machine tool comprising a support having members interfitting with and reciprocable along both of said ways, a slideway on the support arranged perpendicular to the plane surface of the flat way, a second slideway on the support arranged perpendicular to one of the V-way surfaces, a bracket arranged to be slidably mounted on either one of said slideways, a lapping tool mounted on the bracket so that it may contact with the way to be lapped and driving mechanism for rotating and moving the lapping tool to lap said way during reciprocation of the support.

7. A device for lapping the flat way and the V-ways of a machine tool comprising a freely reciprocable supporting frame having an adjustably mounted flat way and a cylindrical bar arranged to interfit with and be reciprocable along the flat and V-ways respectively of the machine tool, a slide way on the support which is substantially perpendicular to the flat way thereof, a second slideway mounted on said cylindrical bar and arranged to be positioned perpendicular to one of the surfaces of the V-way, a lapping tool, driving mechanism for moving the same to provide a lapping action and a slide for adjustably mounting the tool and driving mechanism on either of said slideways so that the tool may have abrading contact with the adjacent machine tool way.

8. A device for lapping the plane faces of the flat and V-ways of a machine tool comprising a frame having two spaced supports having surfaces shaped to slidably interfit with the V-way and slide on the flat way of the tool, a lapping wheel having an effective flat face, a plurality of suports on the frame arranged for removably holding said wheel with its flat face in operative lapping contact with any one of the plane faces of the machine tool ways and driving mechanism for rotating the wheel slowly and revolving it eccentrically at a higher rate to provide an effective break up lapping motion.

9. A device for lapping the plane faces of the flat and V-ways of a machine tool comprising a frame having two spaced supports having surfaces shaped to slidably interfit with the V-way and slide on the flat way of the tool, means for aligning the surfaces of said supports, a lapping wheel having an effective flat surface, means on the frame for supporting the lapping wheel surface in lapping contact with any one of said flat and V-way surfaces and driving mechanism for rotating the wheel slowly and revolving it eccentrically at a higher rate to provide an effective break up lapping motion.

HERBERT S. INDGE.